US012614802B2

(12) United States Patent (10) Patent No.: US 12,614,802 B2
Hase et al. (45) Date of Patent: Apr. 28, 2026

(54) BATTERY CASE

(71) Applicant: TOYOTA JIDOSHA KABUSHIKI KAISHA, Toyota (JP)

(72) Inventors: Saori Hase, Seto (JP); Yutaroh Gotoh, Toyota (JP); Tasuku Zeniya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 512 days.

(21) Appl. No.: 18/125,372

(22) Filed: Mar. 23, 2023

(65) Prior Publication Data

US 2023/0318106 A1 Oct. 5, 2023

(30) Foreign Application Priority Data

Mar. 30, 2022 (JP) ................................. 2022-056837

(51) Int. Cl.
*H01M 50/242* (2021.01)
*H01M 50/204* (2021.01)
*H01M 50/249* (2021.01)

(52) U.S. Cl.
CPC ....... *H01M 50/242* (2021.01); *H01M 50/204* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 9,533,600 B1 * | 1/2017 | Schwab | .............. | H01M 10/613 |
| 2017/0355255 A1 * | 12/2017 | Brausse | ............ | B62D 25/2036 |
| 2019/0157636 A1 * | 5/2019 | Miler | .................... | H01M 50/30 |

FOREIGN PATENT DOCUMENTS

| | | | | | |
|---|---|---|---|---|---|
| CN | 107706328 A | | 2/2018 | | |
| CN | 210110876 U | * | 2/2020 | ......... | H01M 50/289 |
| CN | 215662916 U | | 1/2022 | | |
| JP | 2007269123 A | * | 10/2007 | | |
| JP | 2008-004289 A | | 1/2008 | | |
| JP | 2020-062933 A | | 4/2020 | | |
| WO | WO-2012010769 A1 | * | 1/2012 | ............ | B60N 2/012 |

OTHER PUBLICATIONS

Machine Translation of JP-2007269123-A (Year: 2007).*
Machine Translation of CN-210110876-U (Year: 2020).*
Machine Translation of WO-2012010769-A1 (Year: 2012).*

* cited by examiner

*Primary Examiner* — Gregg Cantelmo
(74) *Attorney, Agent, or Firm* — Sughrue Mion, PLLC

(57) ABSTRACT

A battery case includes: a frame that holds an end portion of a battery in a stacking direction of the battery; a cross member that is disposed so as to extend in the stacking direction of the battery; and a cross bracket that couples the frame and the cross member. The cross bracket includes a base portion that is joined to the frame, and a pair of corner bracket portions that extends from the base portion, that sandwiches a wall portion of the cross member from both sides, and that is joined to the wall portion. A cutout is provided at a site where a surface of each of the pair of corner bracket portions on a side of the wall portion and a surface of the base portion on the side of the wall portion intersect.

4 Claims, 7 Drawing Sheets

STRESS DISPERSION

STRESS CONCENTRATION

BATTERY CASE

CROSS-REFERENCE TO RELATED APPLICATION

This application claims priority to Japanese Patent Application No. 2022-056837 filed on Mar. 30, 2022, incorporated herein by reference in its entirety.

BACKGROUND

1. Technical Field

The present disclosure relates to a battery case that contains a battery, and particularly relates to a battery case that is configured to restrain the battery in a stacking direction of the battery.

2. Description of Related Art

A battery for a vehicle is mounted on the vehicle, in a state where the battery is compressed in a stacking direction of the battery and where the length of the battery is shortened by the application of a high compressive force. The battery mounted on the vehicle starts to elongate in the stacking direction, and therefore it is necessary to restrain the battery in the stacking direction for preventing the elongation of the battery. Japanese Unexamined Patent Application Publication No. 2020-062933 (JP 2020-062933 A) discloses a technology in which the battery stacked in the longitudinal direction of the vehicle is contained between a pair of cross members that bridges the interval between a rocker panel and a floor panel and in which the battery is restrained by the pair of cross members.

In the technology described in JP 2020-062933 A, a restraint load that the cross members receive from the battery is input to connection portions between the cross members and the rocker panel and connection portions between the cross members and the floor panel. The input of the restraint load generates stress at each connection portion. Depending on the structure of the connection portion, stress concentration can occur. However, a technique for dispersing the stress is not disclosed in JP 2020-062933 A. When it is not possible to adequately disperse the stress generated by the restraint load from the battery, it is difficult to enhance the allowable limit of the restraint load from the battery.

As a literature showing a technological level in a technological field related to the present disclosure, Japanese Unexamined Patent Application Publication No 2008-004289 can be exemplified in addition to JP 2020-062933 A.

SUMMARY

The present disclosure has been made in view of the above-described problem, and has an object to provide a battery case that makes it possible to enhance the allowable limit value of the restraint load from the battery.

A battery case in the present disclosure includes: a frame that holds an end portion of a battery in a stacking direction of the battery: a cross member that is disposed so as to extend in the stacking direction of the battery; and a cross bracket that couples the frame and the cross member. The cross bracket includes a base portion that is joined to the frame, and a pair of corner bracket portions that extends from the base portion, that sandwiches a wall portion of the cross member from both sides, and that is joined to the wall portion of the cross member. A cutout is provided at a site where a surface of each of the pair of corner bracket portions on a side of the wall portion of the cross member and a surface of the base portion on the side of the wall portion of the cross member intersect. The stress applied to the cross bracket by the restraint load from the battery is dispersed by the cutout.

In the battery case in the present disclosure, an end portion of the wall portion of the cross member may contact the base portion. Since there is no gap between the end portion of the wall portion and the base portion, it is possible to decrease a free running distance at the time of collision.

In the battery case in the present disclosure, the base portion may have a rectangular shape in which upper ends on both sides are rounded, or a semi-elliptical shape, in lateral view from the stacking direction of the battery. Further, the base portion may be welded to the frame on a single welding line that connects one lower end and the other lower end. Thereby, it is possible to minimize the numbers of starting ends and terminal ends of welding at the time of arc welding between the cross bracket and the frame, and it is possible to perform an arc welding with a robot.

In the battery case in the present disclosure, each of the pair of corner bracket portions may have a rectangular shape in which an upper end of a distal end portion is rounded, or a quadrant elliptical shape, in lateral view from a direction perpendicular to the stacking direction of the battery. Further, each of the pair of corner bracket portions may be welded to the wall portion of the cross member on a single welding line that connects a vicinity of the cutout on an upper side and a lower end of the distal end portion. Thereby, it is possible to minimize the numbers of starting ends and terminal ends of welding at the time of arc welding between the cross bracket and the cross member, and it is possible to perform an arc welding with a robot.

With the battery case in the present disclosure, the stress applied to the cross bracket by the restraint load from the battery is dispersed by the cutout provided at the site where the surface of each of the pair of corner bracket portions on the side of the wall portion of the cross member and the surface of the base portion on the side of the wall portion of the cross member intersect. Thereby, it is possible to alleviate the stress concentration that occurs in the cross bracket, and to enhance the allowable limit value of the restraint load from the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings. When numerical values about each element, as exemplified by number, quantity, amount and range, are mentioned in the embodiment described below, the present disclosure is not limited to the mentioned numerical values, except a case where a clear specification is particularly performed and a case where the present disclosure is obviously limited to the numerical values in principle. Further, structures and the like in the embodiment described below are not always essential for the present disclosure, except a case where a clear specification is particularly performed and a case where the present disclosure is obviously limited to the structure and the like in principle.

1. Structure of Battery Case

Figure 1:
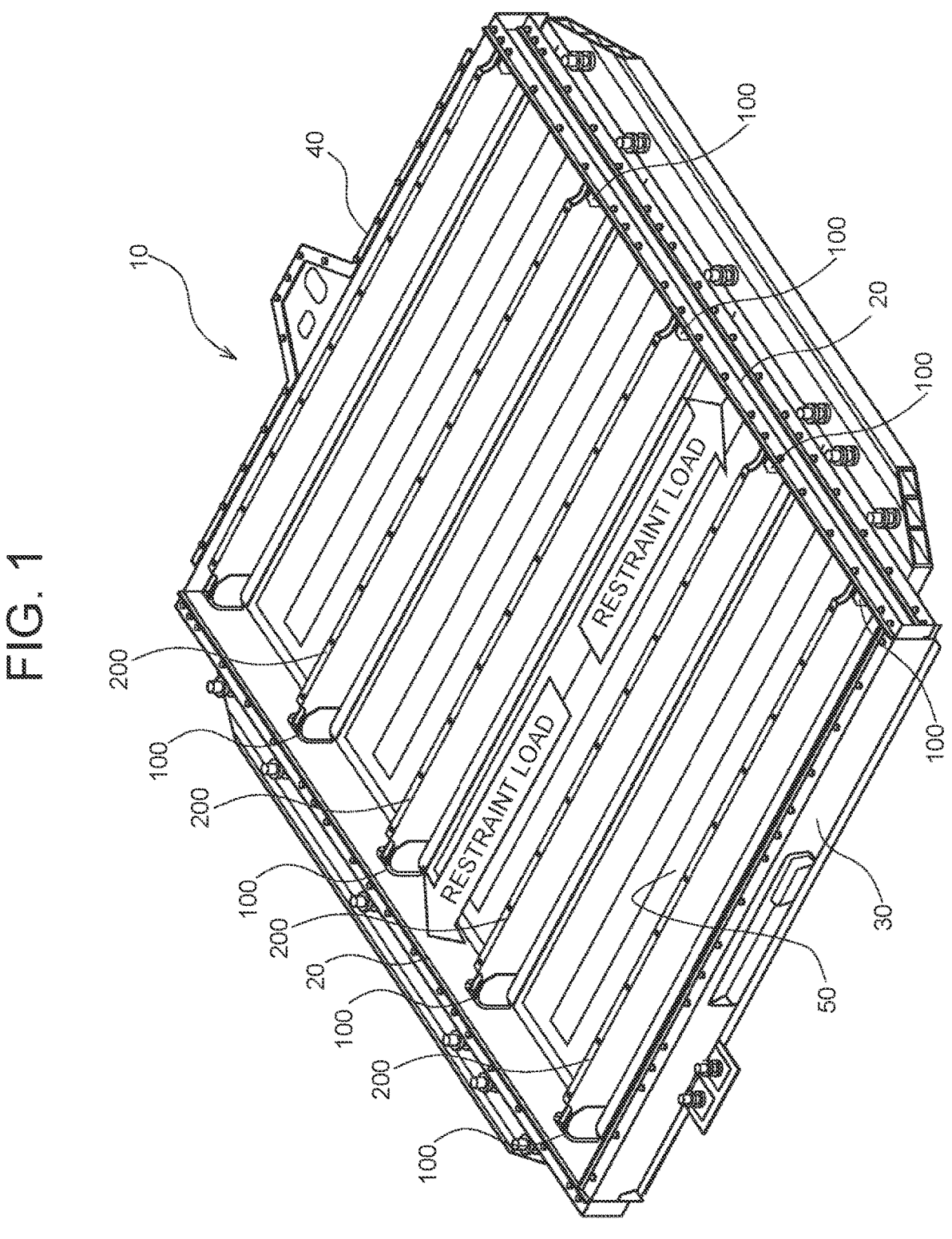
FIG. 1 is a perspective view showing a battery case according to an embodiment of the present disclosure.

FIG. 1 is a perspective view showing the configuration of a battery case 10 according to the embodiment of the present disclosure. The battery case 10 shown in FIG. 1 is in a state where an upper cover is detached. At the time of the mounting on the vehicle, the upper cover is attached in a state where a battery is contained in the interior of the battery case 10. The battery to be contained is a battery stack in which many battery cells are stacked. The battery cell is a secondary battery allowing charge and discharge, and for example, is a lithium-ion secondary battery.

The battery case 10 includes a front frame 30 positioned on the front side of a vehicle at the time of the mounting on the vehicle, a rear frame 40 positioned on the rear side of the vehicle at the time of the mounting on the vehicle, and a pair of side frames 20 positioned on the lateral sides of the vehicle at the time of the mounting on the vehicle. In a casing constituted by these four frames, a plurality of inner crosses (cross members) 200 is provided. The inner crosses 200 are arrayed at even intervals parallel to the front frame 30 and the rear frame 40. The frames and the inner crosses are die-cast products composed of a light metal material, specifically, aluminum. A base plate 50 is joined to a 20 lower surface of the rectangular casing constituted by the frames.

In the battery case 10 having the above configuration, the battery is mounted such that the stacking direction of the battery is along the vehicle width direction of the vehicle. Places where the battery is mounted are spaces each of which is surrounded by the side frames 20 on both sides and two adjacent inner crosses 200, and a space that is surrounded by the side frames 20 on both sides, the rear frame 40 and the rearmost inner cross 200.

The battery is contained in the battery case 10 in a state where the battery is compressed in the stacking direction of the battery and where the length of the battery is shortened by the application of a high compressive force. When the battery is mounted in the battery case 10, the battery starts to elongate in the stacking direction of the battery, but the elongation of the battery in the stacking direction is prevented by the side frames 20 on both sides that are coupled by the plurality of inner crosses 200. At this time, the restraint load that the side frames 20 receive from the battery is born by not only the front frame 30 and the rear frame 40 but also the inner crosses 200 that couple the side frames 20 on both sides.

The restraint load acts on joining portions between the side frames 20 and the inner crosses 200. The battery thermally expands in the stacking direction, and therefore, the restraint load that acts on the joining portion increases at the time of driving. Therefore, in the case where the joining strength of the joining portion is low, there is fear that the joining portion cannot bear the restraint load from the battery. Hence, the side frames 20 and the inner crosses 200 are coupled through cross brackets 100. In the next section, a coupling structure between the side frame 20 and the inner cross 200 in the cross bracket 100 will be described.

2. Coupling Structure Between Side Frame and Inner Cross in Cross Bracket

Figure 2:
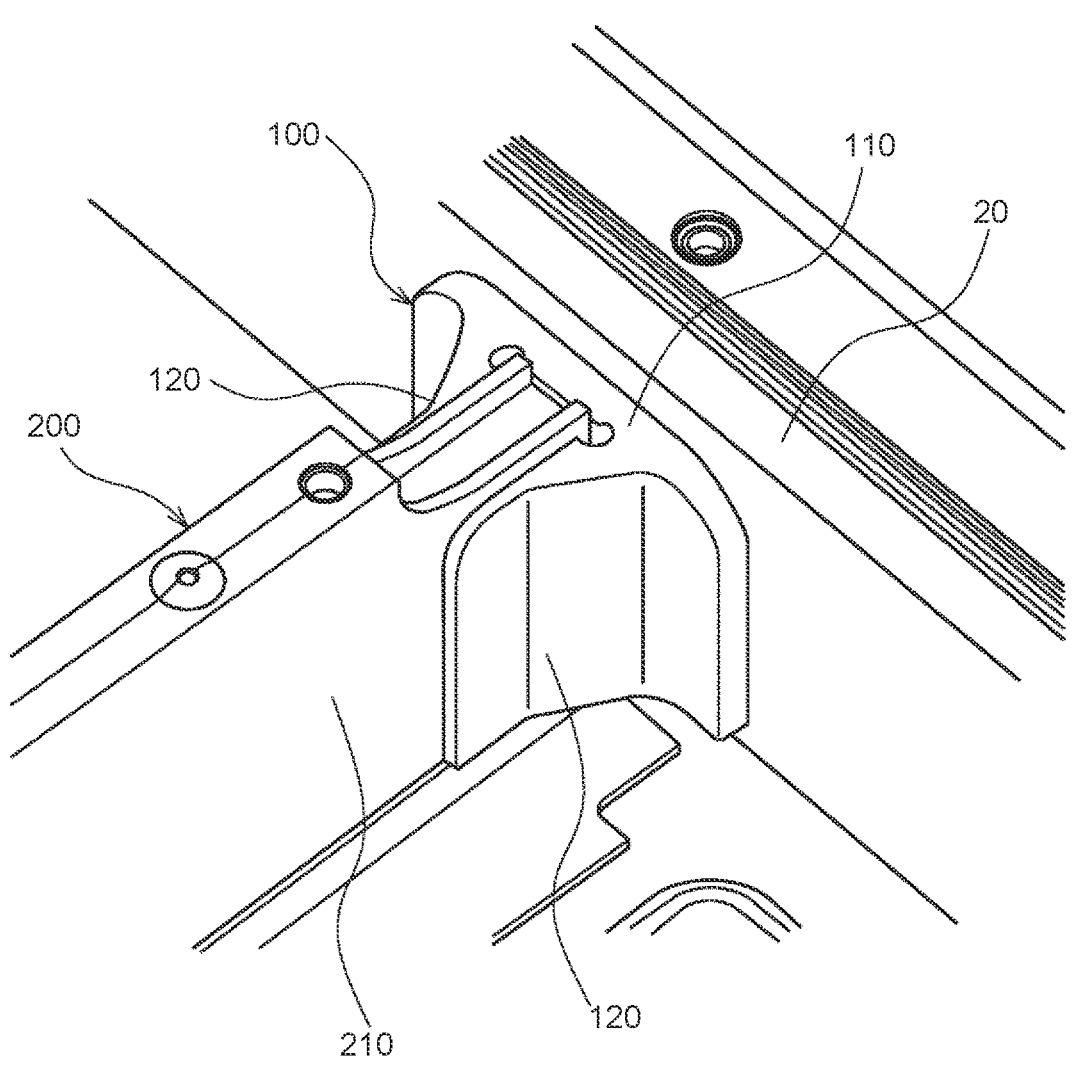
FIG. 2 is a perspective view showing a coupling structure between a side frame and an inner cross in a cross bracket according to the embodiment of the present disclosure.

FIG. 2 is a perspective view showing the coupling structure between the side frame 20 and the inner cross 200 in the cross bracket 100. The cross bracket 100 includes a base portion 110 that is joined to the side frame 20, and a pair of corner bracket portions 120 that extends from the base portion 110 and that sandwiches a wall portion 210 of the inner cross 200 from both sides. Each of the corner bracket portions 120 is joined to the wall portion 210 of the inner cross 200.

Figure 3:
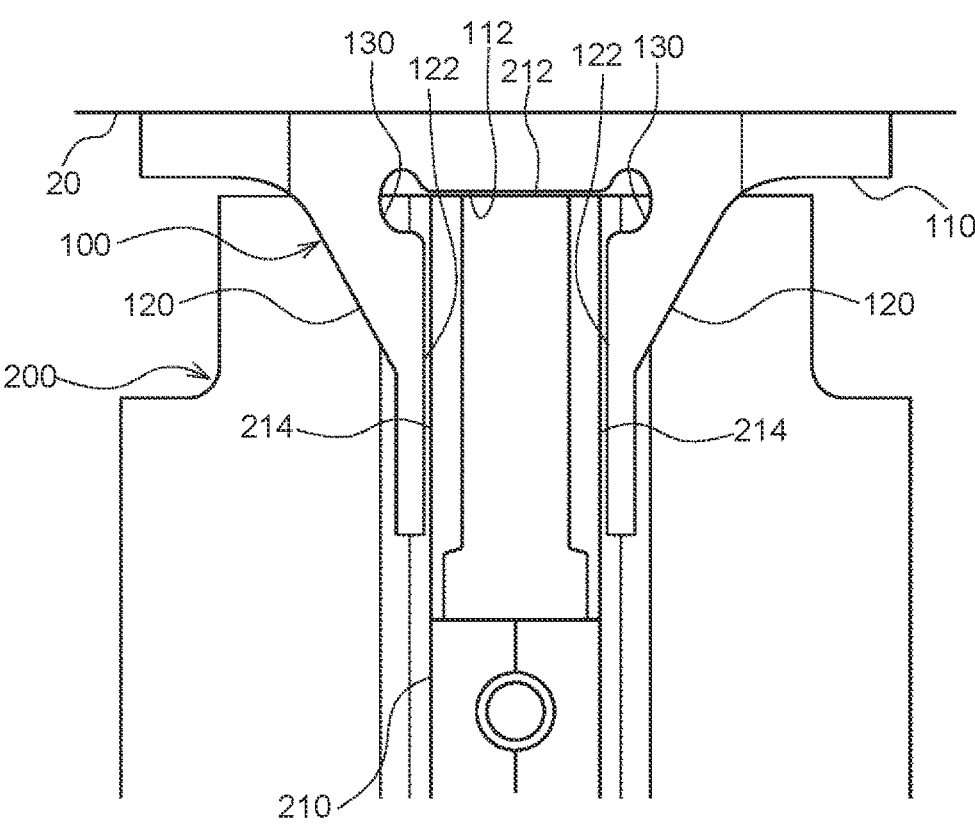
FIG. 3 is a plan view showing the coupling structure between the side frame and the inner cross in the cross bracket according to the embodiment of the present disclosure.

FIG. 3 is a plan view showing the above coupling structure in more detail. The wall portion 210 of the inner cross 200 is pressed against the base portion 110 of the cross bracket 100. That is, an end surface 212 of the wall portion 210 contacts a side surface (a surface on the side of the wall portion 210) 112 of the base portion 110, with no gap. Under this positional relation, side surfaces 214 of the wall portion 210 and side surfaces (surfaces on the side of the wall portion 210) 122 of the corner bracket portions 120 are joined.

When the restraint load from the battery acts, tensile force acts between the base portion 110 and the corner bracket portion 120. The stress to be generated by the tensile force is easily generated at a corner portion where the surfaces intersect and that has a small angle. The stress concentration causes breaking, and decreases the allowable limit of the restraint load from the battery. Therefore, in the cross bracket 100, a technique about shape that makes it hard to cause the stress concentration is adopted.

As the technique about the shape of the cross bracket 100, cutouts 130 are provided at corner portions, that is, at site where the side surfaces 122 of the corner bracket portions 120 and the side surface 112 of the base portion 110 intersect. Since the cutouts 130 are provided at the corner portions, the stress generated by the tensile force is dispersed, so that the stress concentration is alleviated.

Figure 4A:
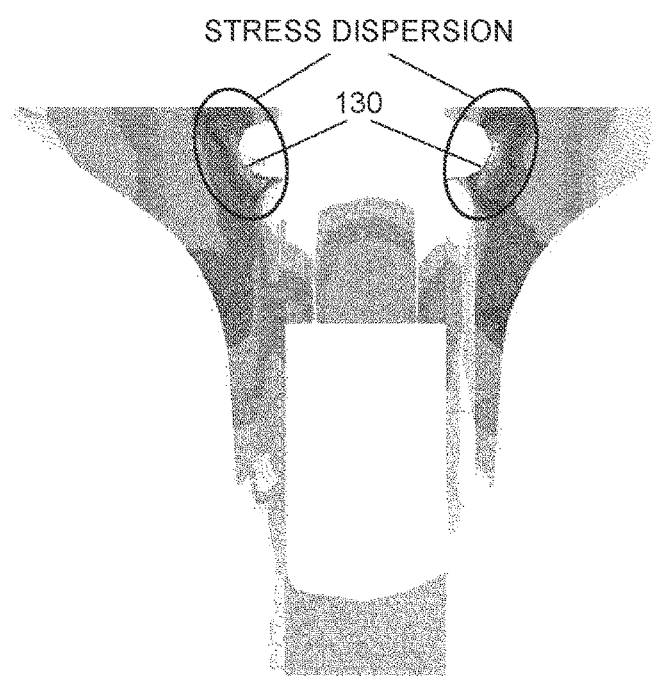
FIG. 4A is a stress analysis diagram of a stress distribution in the cross bracket according to the embodiment of the present disclosure.
Figure 4B:
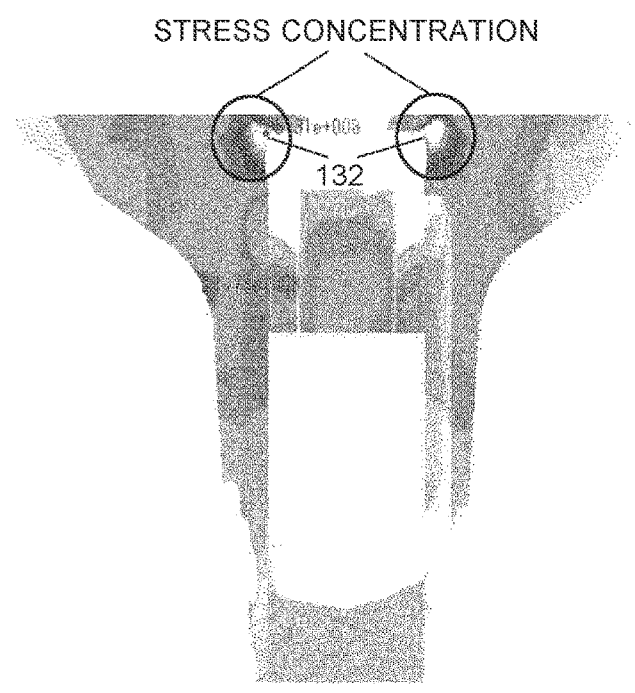
FIG. 4B is a stress analysis diagram of a stress distribution in a cross bracket in a comparative example.

As a general method for alleviating the stress concentration, a method in which a rounding process is performed to the corner portion is known. In the case where the rounding process is performed, the effect of alleviating the stress concentration is limitative, compared to the case where the cutout 130 is provided. FIG. 4A is a stress analysis diagram showing a stress distribution in the case where the cutouts 130 were provided at the corner portions, and FIG. 4B is a stress analysis diagram showing a stress distribution in the case where rounding processes 132 were performed to the corner portions. As can be seen from the comparison between the two figures, in the case where the rounding processes 132 were performed, the stress concentration occurred, and on the other hand, in the case where the cutouts 130 were provided, the stress was dispersed. It was confirmed that the maximum of the stress in the case where the cutouts 130 were provided could be reduced to about half of that in the case where the rounding processes 132 were performed.

Figure 5:
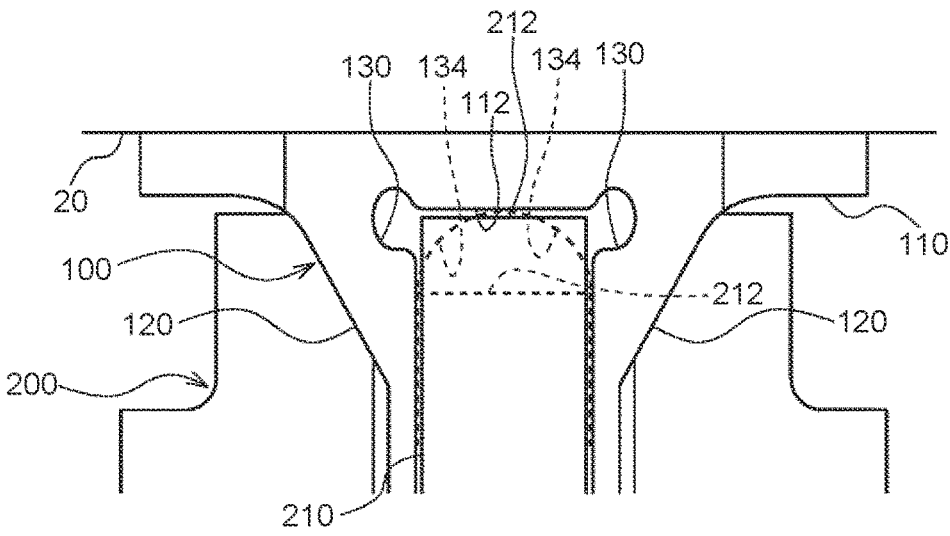
FIG. 5 is a plan view showing a comparison between the cross bracket according to the embodiment of the present disclosure and a cross bracket in another comparative example.

If the purpose of the process is merely to alleviate the stress concentration, the purpose can be achieved even by the rounding process. In the case where rounding processes 134 for a small curvature are performed to the corner portions as shown by dotted lines in FIG. 5, the effect of alleviating the stress concentration is expected equivalently to that in the case where the cutouts 130 are provided. However, in the case where such processes are performed to the corner portions, a large gap is generated between the end surface 212 of the wall portion 210 of the inner cross 200 and the side surface 112 of the base portion 110. This gap increases the free running distance at the time of the side collision of the vehicle. Therefore, it can be said the most suitable method is the method in which the cutouts 130 are provided, for obtaining the effect of alleviating the stress concentration while minimizing the free running distance at the time of the side collision.

3. Welding Structure Among Cross Bracket, Side Frame and Inner Cross

Welding is used for the joining between the cross bracket 100 and the side frame 20. Further, welding is used also for the joining between the cross bracket 100 and the inner cross 200. The welding method that is used is an arc welding with a robot.

Figure 6:
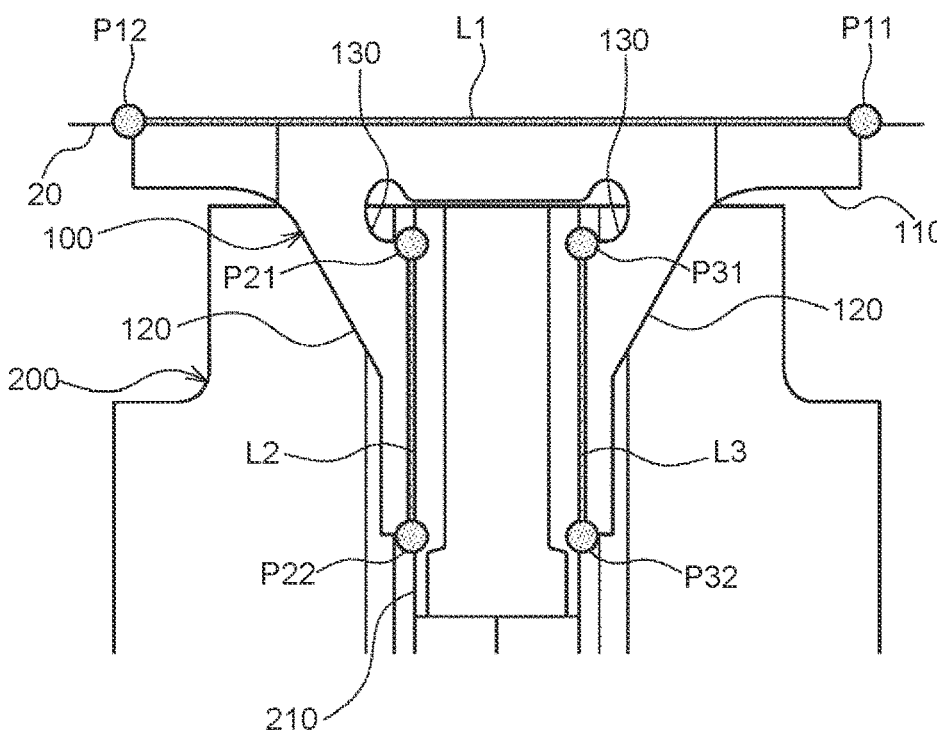
FIG. 6 is a plan view showing a welding structure among the cross bracket according to the embodiment of the present disclosure, the side frame and the inner cross.

FIG. 6 is a plan view showing a welding structure among the cross bracket 100, the side frame 20 and the inner cross 200. The base portion 110 of the cross bracket 100 and the side frame 20 are welded on a welding line L1 that connects a point P11 and a point P12. One of the point P11 and the point P12 is a starting end of the welding line L1, and the other of the point P11 and the point P12 is a terminal end of the welding lie L1. Further, one of the corer bracket portions 120 of the cross bracket 100 and the wall portion 210 are welded on a welding line L2 that connects a point P21 and a point P22. One of the point P21 and the point P22 is a starting end of the welding line L2, and the other of the point P21 and the point P22 is a terminal end of the welding line L2. The other of the corner bracket portions 120 of the cross bracket 100 and the wall portion 210 are welded on a welding line L3 that connects a point P31 and a point P32. One of the point P31 and the point P32 is a starting end of the welding line L3, and the other of the point P31 and the point P32 is a terminal end of the welding line L3.

The starting end and terminal end of the welding line in the arc welding easily become origin points of breakage because of an unstable arc and a relatively low welding strength. Therefore, it is desirable that the numbers of starting ends and terminal ends of welding lines be small as much as possible. In the example shown in FIG. 6, the total number of starting ends and terminal ends of welding lines necessary to couple the side frame 20 and the inner cross 200 through the cross bracket 100 is reduced to six. However, even when the numbers of starting ends and terminal ends of welding lines are small, it is not possible to obtain a sufficient welding strength in the case where the total length of welding lines is short.

As a method for increasing the length of the welding line, there can be a method in which the welding is performed along the contour of a welding object. However, the robot that performs the arc welding can accurately draw the welding line only by a linear motion or a gently curved motion. That is, it is difficult to employ a long welding path, depending on the outer shape of the welding object. Hence, in the cross bracket 100, a technique about shape that makes it possible to employ a long welding line in the arc welding with the robot is adopted.

Figure 7:
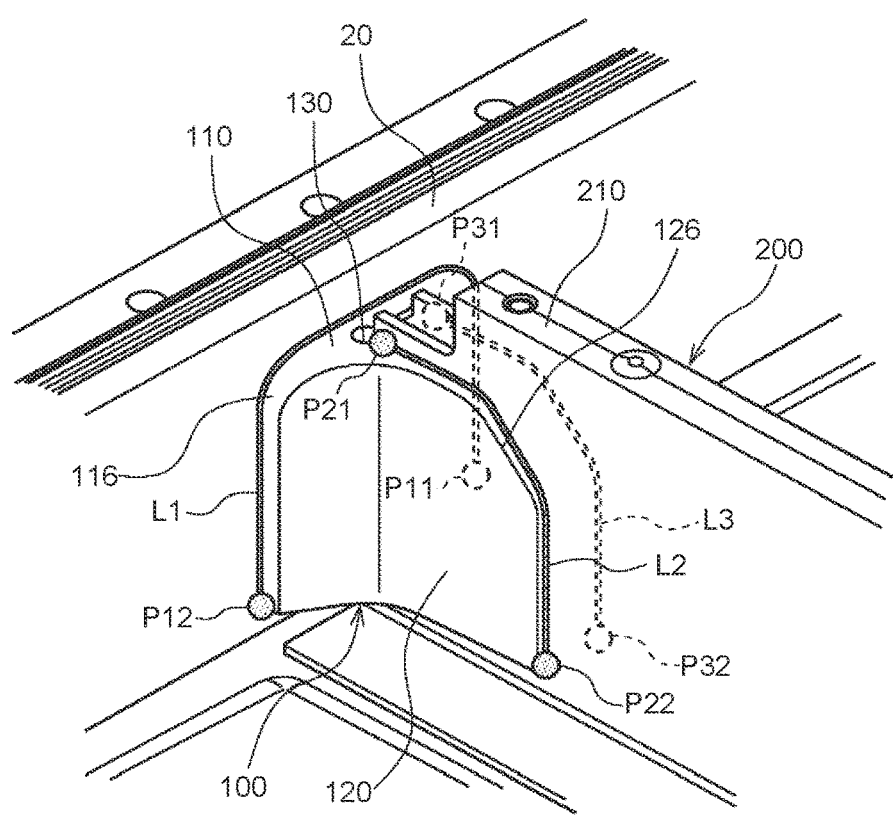
FIG. 7 is a perspective view showing the welding structure among the cross bracket according to the embodiment of the present disclosure, the side frame and the inner cross.

FIG. 7 is a perspective view showing the welding structure among the cross bracket 100, the side frame 20 and the inner cross 200. The base portion 110 of the cross bracket 100 has a so-called hogbacked shape, specifically, a rectangular shape in which upper ends 116 on both sides are rounded, in lateral view from the stacking direction of the battery. For example, the curvature radius of each upper end 116 is 15 mm or more. By this shape of the base portion 110, it is possible to adopt one lower end of the base portion 110 as the point P11, to adopt the other lower end of the base portion 110 as the point P12, and to adopt the single long welding line L1 that connects the point P11 and the point P12 and that is gently curved. Thereby, it is possible to minimize the numbers of starting ends and terminal ends of welding at the time of the arc welding between the cross bracket 100 and the side frame 20, and it is possible to efficiently perform the arc welding with the robot. The shape of the base portion 110 may be a semi-elliptical shape in lateral view from the stacking direction of the battery.

Each of the pair of corner bracket portions 120 has a so-called semi-hogbacked shape, specifically, a rectangular shape in which an upper end 126 of a distal end portion is rounded, in lateral view from the direction perpendicular to the stacking direction of the battery. For example, the curvature radius of the upper end 126 is 15 mm or more. By this shape, it is possible to adopt a vicinity of the cutout 130 on the upper side of one of the corner bracket portions 120 as the point P21, to adopt a lower end of the distal end portion as the point P22, and to adopt the single long welding line L2 that connects both points P21, P22 and that is gently curved. Further, it is possible to adopt a vicinity of the cutout 130 on the upper side of the other of the corner bracket portions 120 as the point P31, to adopt a lower end of the distal end portion as the point P32, and to adopt the single long welding line L3 that connects both points P31, P32 and that is gently curved. Thereby, it is possible to minimize the numbers of starting ends and terminal ends of welding at the time of the arc welding between the cross bracket 100 and the inner cross 200, and it is possible to efficiently perform the arc welding with the robot. The shape of the corer bracket portion 120 may be a quadrant elliptical shape, in lateral view from the direction perpendicular to the stacking direction of the battery.

As described above, the technique about the shape of the cross bracket 100 gives an advantage that it is possible to realize a high-quality and high-efficiency arc welding with the robot. This advantage is shown more clearly by comparisons with two comparative examples described below.

Figure 8:
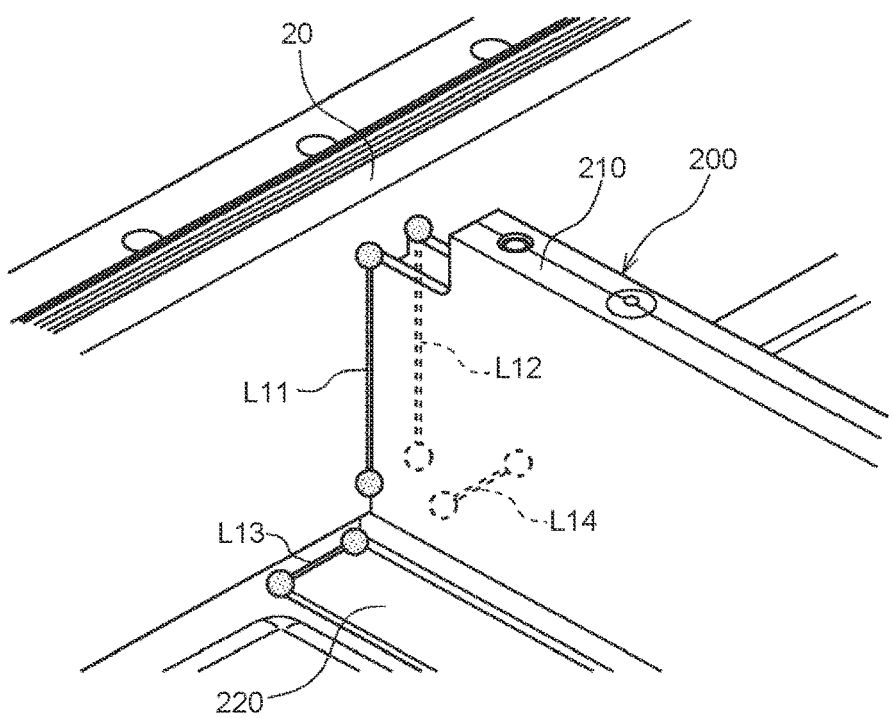
FIG. 8 is a perspective view showing a welding structure between the side frame and the inner cross in a comparative example.

In a first comparative example shown in FIG. 8, the inner cross 200 abuts on the side frame 20, and the side frame 20 and the inner cross 200 are directly welded. In this case, both sides of an end portion of the wall portion 210 of the inner cross 200 are welded to the side frame 20 on a welding line L11 and a welding line L12. Further, bottom portions 220 on both sides of the inner cross 200 are welded to the side frame 20 on a welding line L13 and a welding line L14.

In the first comparative example, the total number of starting ends and terminal ends of welding lines is reduced to eight. However, each welding line is short, and therefore the strength is insufficient. That is, in the first comparative example, the strength is lower compared to the case where the cross bracket 100 is used, and it is not possible to achieve the purpose of the enhancement of the allowable limit value of the restraint load from the battery.

Figure 9:
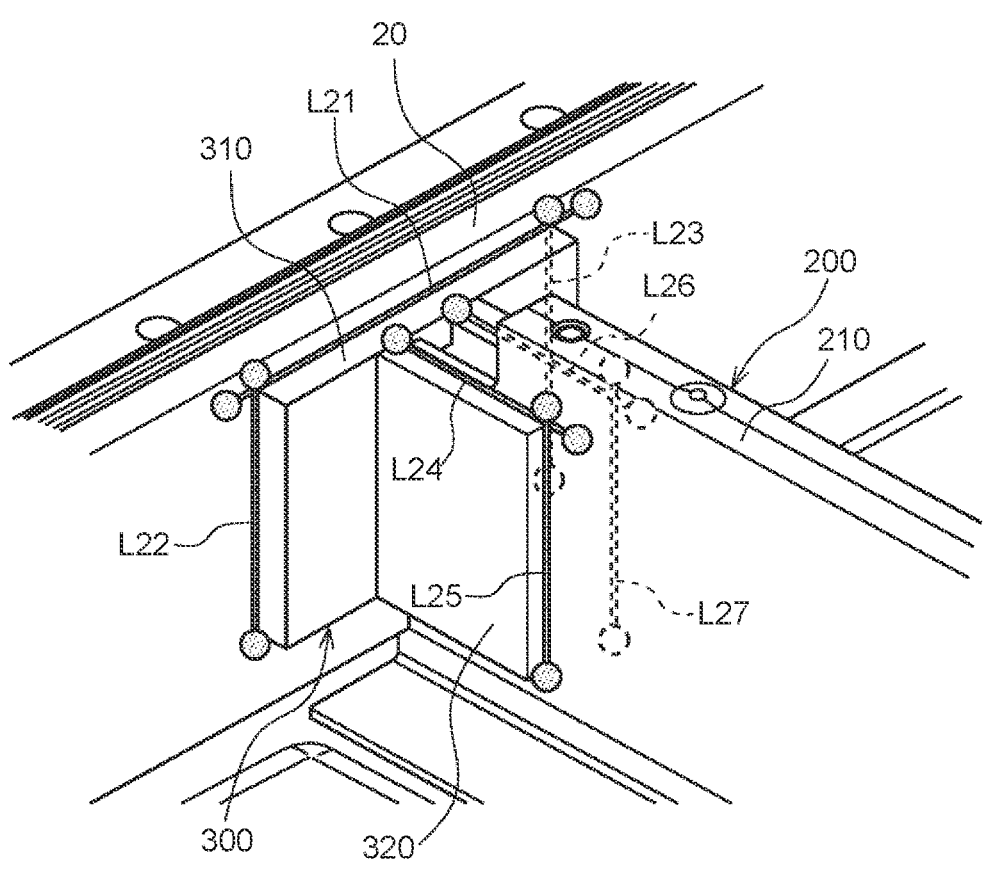
FIG. 9 is a perspective view showing a welding structure among a cross bracket in another comparative example, the side frame and the inner cross.

In a second comparative example shown in FIG. 9, the side frame 20 and the inner cross 200 are coupled through a cross bracket 300. The cross bracket 300 has a simple shape in which each place is processed at right angle, unlike the cross bracket 100. A base portion 310 of the cross bracket 300 has a simple rectangular shape in lateral view from the stacking direction of the battery. Each of corner bracket portions 320 has a simple rectangular shape in lateral view from the direction perpendicular to the stacking direction of the battery.

Even when a welding line is set along a shape that is bent at right angle as in the case of the second comparative example, the robot cannot follow the welding line. Therefore, it is necessary to perform the welding by setting a welding line for each side. For the welding between the side frame 20 and the base portion 310, a total of three welding lines: a welding line L21 in the lateral direction and two welding lines L22, L23 in the vertical direction are necessary. For the welding between the wall portion 210 of the inner cross 200 and the corner bracket portions 320, a total of four welding lines: two welding lines L24, L26 in the lateral direction and two welding lines L25, L27 in the vertical direction are necessary.

As a result, in the case where the cross bracket 300 is used, a total of seven welding lines are necessary, and the total number of starting ends and terminal ends of welding lines is increased to 14. Since the starting end and the terminal end easily become origin points of breakage, it can be said that the second comparative example has a lower quality compared to the case where the cross bracket 100 is used. Further, the number of processes increases as the number of welding lines increases, and therefore it can be said that the second comparative example has a lower efficiency compared to the case where the cross bracket 100 is used.

As is clear from the results of the comparisons with the above two comparative examples, the cross bracket 100 makes it possible to increase the length of each welding line while minimizing the number of welding lines and minimizing the numbers of starting ends and terminal ends that easily become origin points of breakage. Thereby, it is possible to realize a high-quality and high-efficiency arc welding with the robot while securing a high welding strength.

What is claimed is:

1. A battery case comprising:
   a frame that holds an end portion of a battery stack that includes a plurality of battery cells stacked in a stacking direction;
   a cross member that extends in the stacking direction; and
   a cross bracket that couples the frame and the cross member, wherein:
   the cross bracket includes
   a base portion that is joined to the frame, and
   a pair of corner bracket portions that extends from the base portion, that sandwiches a wall portion of the cross member from both sides, and that is joined to the wall portion; and
   a cutout of the cross bracket that is provided at a site where a surface of each of the pair of corner bracket portions on a side of the wall portion and a surface of the base portion on the side of the wall portion intersect, and wherein the cutout of the cross bracket is open toward the cross member in a top plan view.

2. The battery case according to claim 1, wherein an end portion of the wall portion contacts the base portion.

3. The battery case according to claim 1, wherein the base portion has a rectangular shape in which upper ends on both sides are rounded, or a semi-elliptical shape, in lateral view from the stacking direction of the battery stack, and is welded to the frame on a single welding line that connects one lower end and an other lower end.

4. The battery case according to claim 1, wherein each of the pair of corner bracket portions has a rectangular shape in which an upper end of a distal end portion is rounded, or a quadrant elliptical shape, in lateral view from a direction perpendicular to the stacking direction of the battery stack, and is welded to the wall portion on a single welding line that connects a vicinity of the cutout on an upper side and a lower end of the distal end portion.

\* \* \* \* \*